United States Patent
Ko et al.

(10) Patent No.: US 9,736,257 B2
(45) Date of Patent: *Aug. 15, 2017

(54) SERVER CLUSTER AND METHOD FOR PUSH NOTIFICATION SERVICE

(71) Applicant: SAMSUNG ELECTRONICS CO., LTD., Suwon-si (KR)

(72) Inventors: Ka-Ram Ko, Gyeonggi-do (KR); Hee Seo, Seoul (KR); Jung-Hwan Choi, Seoul (KR); In-Gyu Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,812

(22) Filed: Apr. 18, 2016

(65) Prior Publication Data

US 2016/0234327 A1  Aug. 11, 2016

Related U.S. Application Data

(63) Continuation of application No. 14/961,384, filed on Dec. 7, 2015, which is a continuation of application (Continued)

(30) Foreign Application Priority Data

Apr. 6, 2011  (KR) .......................... 10-2011-0031685

(51) Int. Cl.
*H04B 7/00* (2006.01)
*H04B 15/00* (2006.01)
(Continued)

(52) U.S. Cl.
CPC .............. *H04L 67/26* (2013.01); *H04L 67/10* (2013.01); *H04W 4/00* (2013.01); *H04W 8/22* (2013.01); *H04W 88/02* (2013.01)

(58) Field of Classification Search
CPC ....................................................... H04L 67/26
(Continued)

(56) References Cited

U.S. PATENT DOCUMENTS 5,436,960 A    7/1995  Campana, Jr. et al.
6,763,384 B1 *  7/2004  Gupta .................... G06Q 30/08
                                                          709/224

(Continued)

OTHER PUBLICATIONS

Office Action dated Nov. 25, 2016, issued by the United States Patent and Trademark Office in U.S. Appl. No. 14/961,384.

*Primary Examiner* — Tilahun B Gesesse
(74) *Attorney, Agent, or Firm* — Sughrue Mion, PLLC

(57) ABSTRACT

A server cluster and method for providing a push notification service are provided. The method includes searching for, by a management server cluster, a first push server corresponding to predetermined search criteria from among a plurality of push servers upon receiving a request to connect with a push server from a mobile terminal; providing, by the management server cluster, connection information regarding the found first push server to the mobile terminal; and delivering, by the first push server, upon generation of a notification event after connecting with the mobile terminal, event information corresponding to the push notification event to the connected mobile terminal.

16 Claims, 5 Drawing Sheets

Related U.S. Application Data

No. 13/441,486, filed on Apr. 6, 2012, now Pat. No. 9,210,231.

(51) Int. Cl.
*H04L 29/08* (2006.01)
*H04W 4/00* (2009.01)
*H04W 8/22* (2009.01)
*H04W 88/02* (2009.01)

(58) Field of Classification Search
USPC .............................. 455/412.1, 415, 517, 422
See application file for complete search history.

(56) References Cited

U.S. PATENT DOCUMENTS

| | | | |
|---|---|---|---|
| 8,396,455 B2* | 3/2013 | Carlson | H04L 12/5855 455/406 |
| 8,630,624 B2* | 1/2014 | Marcellino | H04L 51/24 455/3.01 |
| 8,682,981 B2 | 3/2014 | McCarthy et al. | |
| 8,775,535 B2 | 7/2014 | Hugg et al. | |
| 2002/0161833 A1* | 10/2002 | Niven | H04L 29/06 709/203 |
| 2004/0166834 A1 | 8/2004 | Omar et al. | |
| 2005/0172026 A1 | 8/2005 | Jeon et al. | |
| 2007/0027885 A1 | 2/2007 | Oshida | |
| 2008/0177844 A1 | 7/2008 | McCarthy et al. | |
| 2010/0262650 A1 | 10/2010 | Chauhan et al. | |
| 2011/0289172 A1 | 11/2011 | Marcellino | |
| 2014/0164541 A1 | 6/2014 | Marcellino | |

* cited by examiner

SERVER CLUSTER AND METHOD FOR PUSH NOTIFICATION SERVICE

PRIORITY

This application is a continuation application of U.S. patent application Ser. No. 14/961,384, filed on Dec. 7, 2015, in the U.S. Patent and Trademark Office, which is a continuation application of U.S. patent application Ser. No. 13/441,486, filed on Apr. 6, 2012, in the U.S. Patent and Trademark Office, now U.S. Pat. No. 9,210,231, which claims priority under 35 U.S.C. §119(a) to Korean Patent Application No. 10-2011-0031685, filed in the Korean Intellectual Property Office on Apr. 6, 2011, the disclosures of which are incorporated herein by reference in their entireties.

BACKGROUND OF THE INVENTION

1. Field of the Invention

The present invention relates generally to an apparatus for providing a push notification service, and more particularly, to a server cluster for a push notification service, which includes a management server for managing connection between a push server and a mobile terminal and the push server for push notification, and a method for the push notification service.

2. Description of the Related Art

A push notification server is a gateway between a push notification providing server for a push notification service and a mobile terminal, and relays a push notification message sent from the push notification providing server to its connected mobile terminal.

The push notification server is used by a developer of an application program installed in the mobile terminal to transmit a notification message to the installed application program.

A server cluster consists of independent computer systems that operate together as if they are a single system, and allows a client to use server resources as if using a single server. This cluster scheme can improve extensibility and reliability, due to the ease of adding additional server extensions for server performance improvement as well as the ability to use another system to immediately provide a service when a problem occurs within a particular system.

In a general server cluster system, all requests are made through a load balance server (or switch) positioned at a front end. For a web application, in most cases, it is important to give a response to a request as rapidly as possible, such that the server cluster system is configured to receive as many one-shot connection sessions as possible.

As such, in a conventional push notification server, almost all requests must maintain a connection session during a heartbeat interval, resulting in high cost for maintaining the connection session.

Therefore, when a push notification server is configured with a conventional general server cluster system, the load of the load balance server extremely increases, resulting in additional expenses.

Even with the additional expenses, such a configuration with general server cluster may not meet the requirements of the push notification server.

SUMMARY OF THE INVENTION

The present invention is provided to address at least the above problems and/or disadvantages and to provide at least the advantages described below.

Accordingly, an aspect of the present invention provides a server cluster for a push notification service, which includes a server for performing a connection operation for a push notification service and a server for performing a notification operation for push notification, and a method for the push notification service.

According to an aspect of the present invention, there a server cluster for a providing push notification service is provided. The server cluster includes a management server cluster for, upon receiving, from the mobile terminal, a request to connect with a push server, searching for a first push server corresponding to predetermined search criteria from among a plurality of push servers included in the server cluster, and providing connection information corresponding to the found first push server to the mobile terminal; and the first push server for delivering, when a push notification event is generated, event information corresponding to the push notification event to the mobile terminal.

According to another aspect of the present invention, there is provided a method for a providing push notification service in a push notification server cluster is provided. The method includes searching for, by a management server cluster, a first push server corresponding to predetermined search criteria from among a plurality of push servers upon receiving a request to connect with a push server from a mobile terminal; providing, by the management server cluster, connection information regarding the found first push server to the mobile terminal; and delivering, by the first push server, upon generation of a notification event after connecting with the mobile terminal, event information corresponding to the push notification event to the connected mobile terminal.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. In the following description and accompanying drawings, a detailed description of known functions or configurations incorporated herein may be omitted in order to avoid obscuring the subject matter of the present invention.

Figure 1:
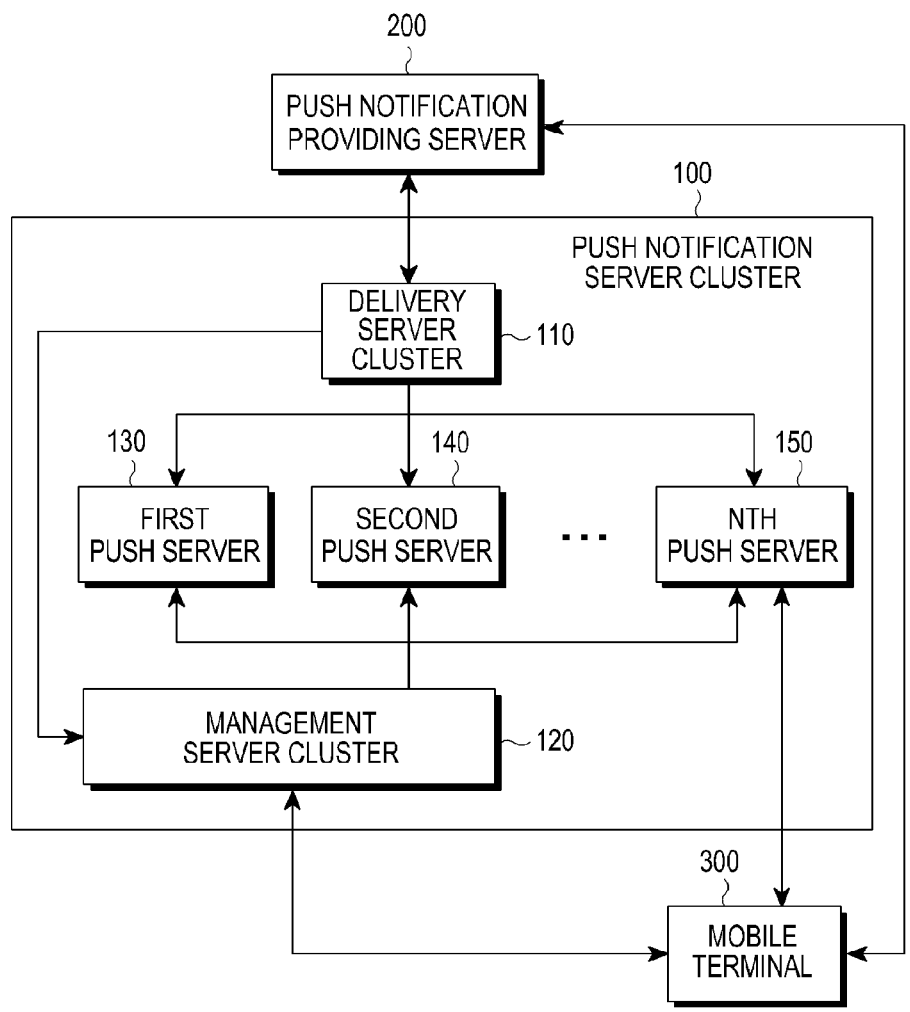
FIG. 1 is a structural diagram illustrating a push notification system according to an embodiment of the present invention.

FIG. 1 is a structural diagram illustrating a push notification system according to an embodiment of the present invention.

As shown in FIG. 1, a push notification system according to an embodiment of the present invention includes a push notification server cluster 100, a push notification providing server 200, and a mobile terminal 300.

The push notification server cluster 100 includes a delivery server cluster 110, a management server cluster 120, a first push server 130, a second push server 140, . . . , and an $n^{th}$ push server 150.

Herein, the push notification server cluster 100 manages push server information for at least one push server and push registration information for connection with the mobile terminal 300, and determines a push server to be connected with the mobile terminal 300.

The delivery server cluster 110 delivers a push notification event received from the push notification providing server 200 to the push server connected with the mobile terminal 300.

The management server cluster 120 is connected with the at least one push server, and manages the connected push servers.

Upon receiving a request for connection information regarding a push server from the mobile terminal 300 to be provided with the push notification service, the management server cluster 120 determines a push server suitable for a predetermined determination criterion from previously stored connection information regarding the at least one push server, and provides the connection information regarding the determined push server to the mobile terminal 300.

The first push server 130 is connected with the mobile terminal 300, and provides the push notification service with respect to the connected mobile terminal 300.

The push notification providing server 200 provides the push notification service according to a push notification request. When the push notification event occurs, the push notification providing server 200 notifies the delivery server cluster 110 of the push notification event.

The mobile terminal 300 sends a request for connection information indicating the push server to be connected to the management server cluster 120, in order to receive the push notification service.

Upon receiving the requested connection information, the mobile terminal 300 connects with the push server by using the connection information. The mobile terminal 300 sends a registration request to the push server corresponding to the received connection information, and upon receiving the registration information, the mobile terminal 300 connects with the push server.

As described above, the push notification system according to an embodiment of the present invention separates the management server cluster, which manages connects the mobile terminal to the push server, from the push server for delivering the push notification event, thereby reducing load of the management server cluster and maximizing system efficiency.

Figure 2:
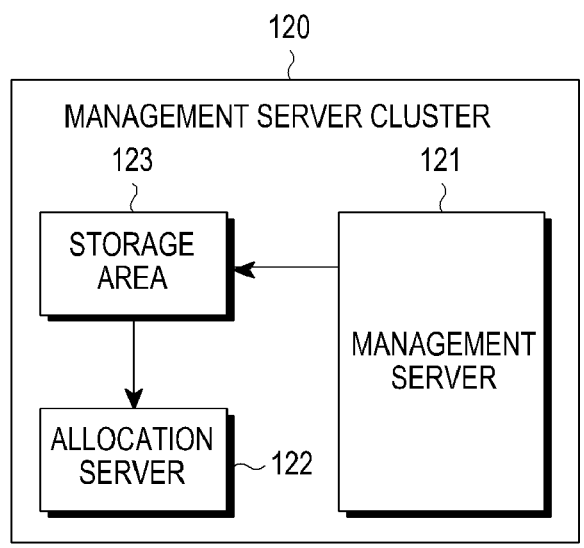
FIG. 2 is a structural diagram illustrating a management server cluster according to an embodiment of the present invention.

FIG. 2 is a structural diagram illustrating a management server cluster according to an embodiment of the present invention.

Referring to FIG. 2, the management server cluster 120 may include a management server 121, an allocation server 122, and a storage area 123.

The management server 121, upon receiving the registration information regarding the mobile terminal 300 to be connected from the push server, stores the received registration information in the storage area 123.

The allocation server 122, upon receiving a request for connection to a push server for providing the push notification service, searches for a push server corresponding to a predetermined search criterion and search condition from among the at least one push servers, searches for connection information regarding the found push server in the connection information regarding the at least one push server, which has been previously stored in the storage area 123, and delivers the connection information regarding the found push server to the mobile terminal 300. The connection information regarding the push server includes an address of the push server.

The allocation server 122, when searching for the push server corresponding to the predetermined criterion, makes a determination by considering a search condition such as performance of the at least one push server previously stored in the storage area 123 and a number of currently allocated mobile terminals according to a predetermined search criterion. Herein, the predetermined search criterion may include a memory resource of the system, socket related information according to an operating system, a Central Processing Unit (CPU), a network bandwidth, etc.

The allocation server 122, upon receiving a request for push server reallocation from the mobile terminal 300, searches for another push server corresponding to a predetermined search criterion and search condition from among the at least one push servers, searches for connection information regarding the found another push server in the connection information regarding the at least one push servers which is previously stored in the storage area 123, and provides the connection information regarding the found another push server to the mobile terminal 300.

The storage area 123 stores the connection information regarding the at least one push server, and the search condition and search criterion corresponding to the request from the mobile terminal 300.

Figure 3:
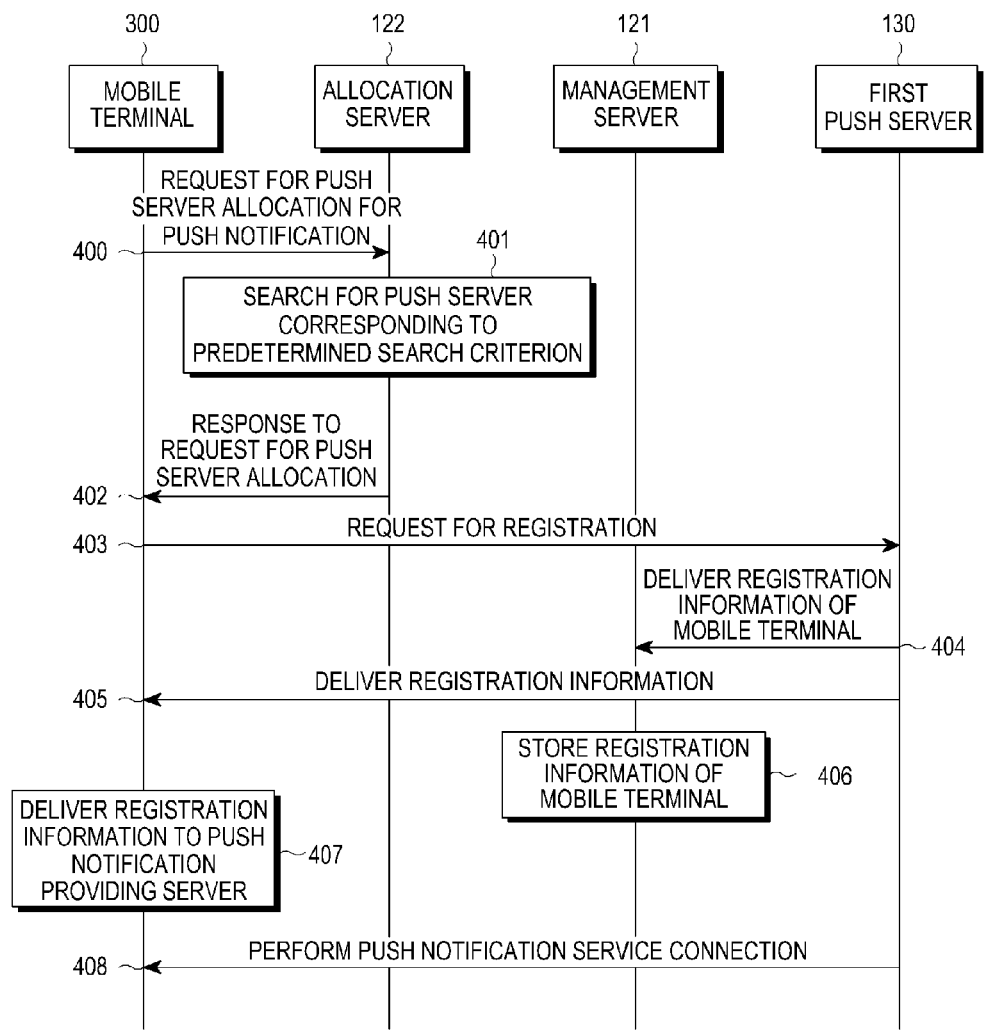
FIG. 3 is a flowchart illustrating a process of performing connection between a mobile terminal and a first push server in a push notification system according to an embodiment of the present invention.

FIG. 3 is a flowchart illustrating a process of performing connection between a mobile terminal and a first push server in a push notification system according to an embodiment of the present invention.

In step 400, the mobile terminal 300 sends a request for push server allocation to the allocation server 122.

In step 401, the allocation server 122 searches for a push server corresponding to predetermined search criterion from among the at least one push servers. In the present example, first push server 130 is the push server corresponding to the predetermined search criterion.

In step 402, the allocation server 122 delivers, to the mobile terminal 300, a response to the request for push server allocation, which includes found connection information regarding the first push server 130.

In step 403, the mobile terminal 300 sends a request for registration to the first push server 130 by using the received connection information regarding the first push server 130.

The first push server 130 delivers registration information regarding the mobile terminal 300 to the management server 121 and the mobile terminal 300 in steps 404 and 405, respectively.

In step 406, the management server 121 stores the received registration information regarding the mobile terminal 300 in the storage area 123.

In step 407, the mobile terminal 300 delivers information related to registration with the first push server 130 to the push notification providing server 200 (not shown). The registration related information may include connection information between the first push server 130 and the mobile terminal 300 and identification information of the mobile terminal 300.

In step 408, the mobile terminal 300 and the first push server 130 perform a push notification service connection.

According to an embodiment of the present invention, the mobile terminal 300 connects to the management server cluster 120 and the first push server 130 so as to be provided with the push notification service, and requests and responses are exchanged between these entities. This connection refers to a one-shot connection in a manner similar to a connection performed with respect to a web request, where a request is received, an operation is performed in a server, and a response is returned.

However, after a connection between the mobile terminal and the push server is established, a connection session is maintained during a heartbeat interval of the mobile terminal. Rapid processes and responses are important to connections for a session between the mobile terminal and the push server. Even though the number of connections may be relatively small, the connection for maintaining the session is maintained in spite of the extremely small amount of communicated data.

Therefore, by separating different types of connections, the management server cluster performs management of and connection between the mobile terminal and the push server, and the push server performs connections requiring a plurality of connection session resources, thereby reducing load of the management server cluster. In addition, the management server cluster merely performs registration of the mobile terminal and management of the push server, maximizing efficiency.

Figure 4:
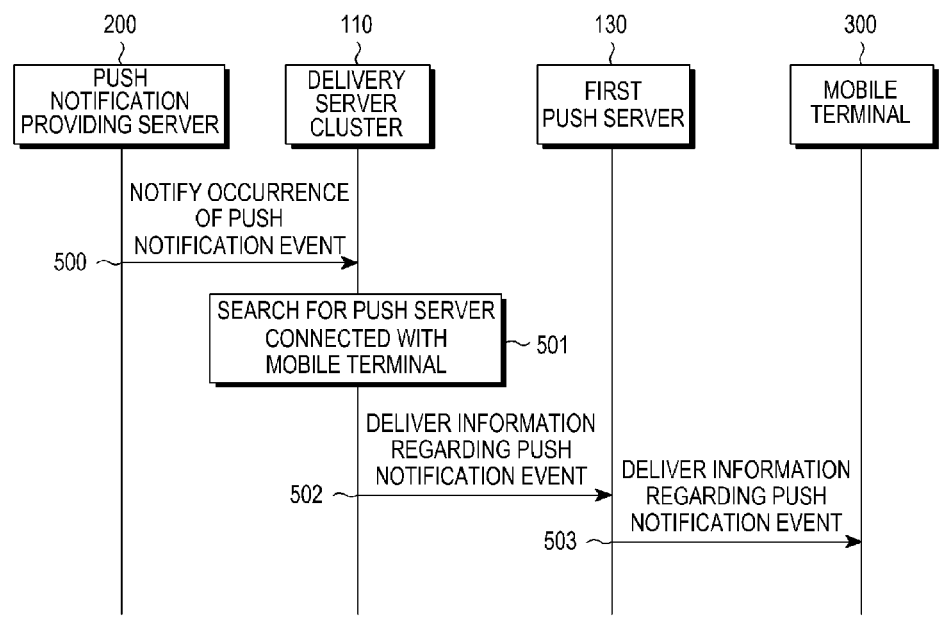
FIG. 4 is a flowchart illustrating a process of delivering a push notification event in a push notification system according to an embodiment of the present invention.

FIG. 4 is a flowchart illustrating a process of delivering a push notification event in a push notification system according to an embodiment of the present invention.

Referring to FIG. 4, in step 500, when a push notification event occurs, the push notification providing server 200 notifies the delivery server cluster 110 of the occurrence.

In step 501, the delivery server cluster 110 searches for connection information regarding the push server connected with the mobile terminal 300 in the connection information stored in the storage area 123.

In step 502, the delivery server cluster 110 notifies the push server of the push notification event by using the found connection information regarding the push server. In the present example, the first push server 130 is the found push server. The delivery server cluster 110 delivers information regarding the push notification event received from the push notification providing server 200 to the first push server 130.

In step 503, the first push server 130 delivers the information regarding the push notification event received from the delivery server cluster 110 to the mobile terminal 300.

When the push notification event occurs, the push notification event is delivered by the delivery server cluster through the session connected between the push server and the mobile terminal, such that the push server merely performs event transmitting and receiving operations using the connection session, thereby improving the efficiency of the push notification service through efficient division of operations in the system.

Figure 5:
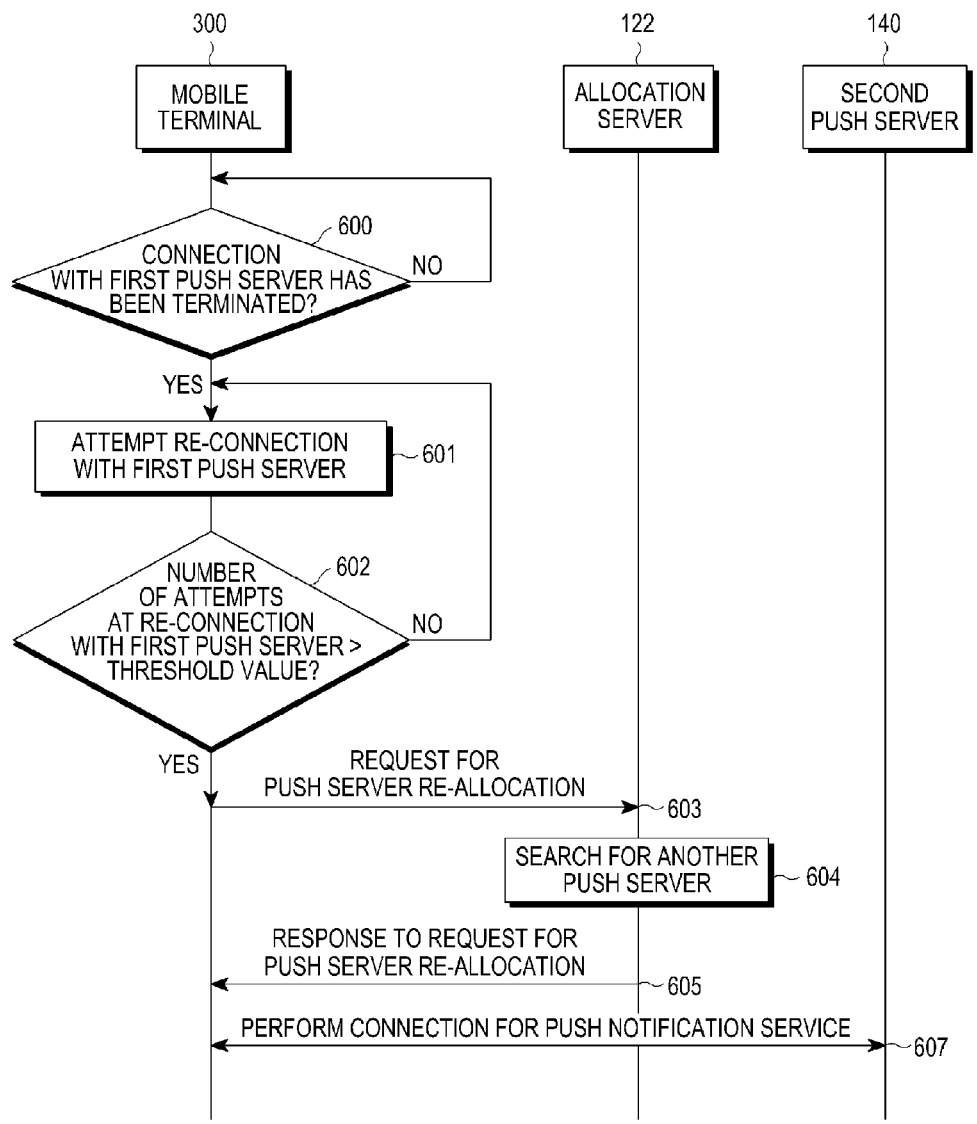
FIG. 5 is a flowchart illustrating a process of reallocating a push server to a mobile terminal in a push notification system according to an embodiment of the present invention.

FIG. 5 is a flowchart illustrating a process of reallocating a push server to a mobile terminal in a push notification system according to an embodiment of the present invention.

Referring to FIG. 5, in step 600, the mobile terminal 300 determines whether a connection with the first push server 130 has been terminated. If the connection has been terminated, the method proceeds to step 601. Unless the connection with the first push server 130 has been terminated, the mobile terminal 300 continues determining whether connection with the first push server 130 has been terminated in step 600.

In step 601, the mobile terminal 300 attempts re-connection with the first push server 130.

In step 602, the mobile terminal 300 determines whether the number of attempts to re-connect with the first push server 130 is greater than a predetermined threshold value. If the number of reconnection attempts exceeds the threshold, the method proceeds to step 603. Unless the number of attempts is larger than the predetermined threshold value, the mobile terminal 300 continues attempting re-connection with the first push server 130 at step 601.

In step 603, the mobile terminal 300 sends a request for push server re-allocation to the allocation server 122.

In step 604, the allocation server 122 searches for another push server for re-allocation. More specifically, the allocation server 122 searches for another push server corresponding to predetermined search condition and search criterion from among the remaining at least one push servers except for the push server which is not re-connected, searches for connection information regarding the found another push server in the connection information regarding the at least one push servers which is previously stored in the storage area 123. Herein, in the present example the found another push server is a second push server 140.

In step 605, the allocation server 122 delivers a response to the request for push server re-allocation, which includes connection information regarding the found another push server, to the mobile terminal 300.

In step 607, the mobile terminal 300 and the second push server 140 perform a connection for the push notification service.

As described above, the push notification system according to embodiments of the present invention separates the management server cluster for performing connection between and management of the mobile terminal and the push server from the push server for delivering the push notification event, thereby reducing load of the management server cluster and maximizing system efficiency.

In addition, according to embodiments of the present invention, operations of the management server cluster and the push server of the push notification server cluster are performed separately according to connection characteristics, such that the overall service efficiency can be improved and cost can be cut down through efficient operation division.

Moreover, according to embodiments of the present invention, the push notification server cluster has a dual cluster structure including the management server cluster, and accordingly, increasing the number of push servers of the push notification server cluster or adding the management server cluster and the delivery server cluster to the push notification server cluster becomes more simplified. Therefore, the push notification server cluster can be easily extended according to the performance of the server required for the service.

Furthermore, the push notification server cluster according to embodiments of the present invention may have a double cluster structure, such that even when an independent system forming a node goes down, another node can immediately replace the system, thereby providing a proper service at all times without interruption of the entire service.

Therefore, according to embodiments of the present invention, the management server cluster merely performs a connection between and management of the mobile terminal and the push server, thereby establishing the efficient push notification server cluster.

While the invention has been shown and described with reference to certain embodiment thereof, it will be understood by those skilled in the art that various changes in form and details may be made therein without departing from the scope of the invention as defined by the appended claims and their equivalents.

What is claimed is:

1. A push notification system for providing a push notification service, the system comprising:
 a first server configured to deliver a push notification to an electronic device based on receiving a push notification event from a push notification providing server; and
 a second server configured to allocate, for the electronic device, the first server among a plurality of servers, for delivering at least one push notification, of the push notification system based on a request from the electronic device to register for the push notification service with the push notification system, and provide, to the electronic device, information for delivering the push notification.

2. The push notification system of claim 1, wherein the information for delivering the push notification comprises an Internet Protocol (IP) address of the first server.

3. The push notification system of claim 2, wherein the second server is further configured to allocate the first server based on processing performance of the first server.

4. The push notification system of claim 2, wherein the second server is further configured to allocate the first server based on processing resources of the first server.

5. The push notification system of claim 4, wherein the processing resources of the first server comprise central processing unit (CPU) resources of the first server.

6. The push notification system of claim 4, wherein the processing resources of the first server comprise memory resources of the first server.

7. The push notification system of claim 2, wherein the second server is further configured to allocate the first server based on a quantity of electronic devices allocated to the first server.

8. The push notification system of claim 2, wherein the first server is further configured to establish a connection session with the electronic device.

9. The push notification system of claim 8, wherein the first server is further configured to deliver the push notification to the electronic device using the connection session.

10. The push notification system of claim 1, wherein the second server is further configured to allocate the first server based on processing performance of the first server.

11. The push notification system of claim 1, wherein the second server is further configured to allocate the first server based on processing resources of the first server.

12. The push notification system of claim 11, wherein the processing resources of the first server comprise central processing unit (CPU) resources of the first server.

13. The push notification system of claim 11, wherein the processing resources of the first server comprise memory resources of the first server.

14. The push notification system of claim 1, wherein the second server is further configured to allocate the first server based on a quantity of electronic devices allocated to the first server.

15. The push notification system of claim 1, wherein the first server is further configured to establish a connection session with the electronic device.

16. The push notification system of claim 15, wherein the first server is further configured to deliver the push notification to the electronic device using the connection session.

* * * * *